(12) United States Patent
Park

(10) Patent No.: US 9,582,196 B2
(45) Date of Patent: Feb. 28, 2017

(54) MEMORY SYSTEM

(71) Applicant: SK hynix Inc., Gyeonggi-do (KR)

(72) Inventor: Jong-Ju Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 29 days.

(21) Appl. No.: 14/856,255

(22) Filed: Sep. 16, 2015

(65) Prior Publication Data

US 2016/0328150 A1  Nov. 10, 2016

(30) Foreign Application Priority Data

May 7, 2015  (KR) .................. 10-2015-0063641

(51) Int. Cl.
*G06F 12/00* (2006.01)
*G06F 3/06* (2006.01)
*G06F 13/18* (2006.01)

(52) U.S. Cl.
CPC ............ *G06F 3/061* (2013.01); *G06F 3/0659* (2013.01); *G06F 3/0685* (2013.01); *G06F 13/18* (2013.01)

(58) Field of Classification Search
None
See application file for complete search history.

(56) References Cited

U.S. PATENT DOCUMENTS

| | | | |
|---|---|---|---|
| 2003/0149838 A1* | 8/2003 | Mowery | G06F 3/0601 711/113 |
| 2004/0205776 A1 | 10/2004 | Harrington et al. | |
| 2006/0047999 A1* | 3/2006 | Passerini | G06F 11/1458 714/6.12 |
| 2013/0191693 A1* | 7/2013 | Ross | G06F 11/0778 714/45 |

\* cited by examiner

*Primary Examiner* — Brian Peugh
(74) *Attorney, Agent, or Firm* — IP & T Group LLP

(57) ABSTRACT

A memory system includes a plurality of memory devices; and a controller suitable for: dividing a plurality of commands applied from a host into first and second group commands according to a preset division reference, storing first and second group commands in first and second storage spaces, respectively, and alternately providing the first and second group commands to the plurality of memory devices according to a preset change reference.

19 Claims, 12 Drawing Sheets

MEMORY SYSTEM

CROSS-REFERENCE TO RELATED APPLICATION

This application claims priority under 35 U.S.C. §119 to Korean Patent Application No. 10-2015-0063641 filed on May 7, 2015 in the Korean Intellectual Property Office, the disclosure of which is incorporated herein by reference in its entirety.

TECHNICAL FIELD

Exemplary embodiments relate to a semiconductor design technology, and more particularly, to a memory system capable of effectively processing commands inputted from a host.

DISCUSSION OF THE RELATED ART

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Various embodiments are directed to a memory system capable of alternately providing commands to a plurality of memory devices.

In an embodiment, a memory system may include: a plurality of memory devices; and a controller suitable for: dividing a plurality of commands applied from a host into first and second group commands according to a preset division reference, storing first and second group commands in first and second storage spaces, respectively, and alternately providing the first and second group commands to the plurality of memory devices according to a preset change reference.

The controller may include a command determination unit suitable for dividing the plurality of commands into the first and second group commands according to the preset division reference; and a change operation control unit suitable for alternately providing the first and second group commands to the plurality of memory devices according to the preset change reference.

The first group commands may include one or more commands which do not change physical status of data in the plurality of memory devices, and the second group commands may include one or more commands which change the physical status of data in the plurality of memory devices.

The first group commands may include one or more commands for reading the data stored in the plurality of memory devices, and the second group commands may include one or more commands for writing and erasing data in the plurality of memory devices.

The change operation control unit may include a change signal generation section suitable for generating a change signal, a state of which is determined between first and second states according to the preset change reference that is determined based on information of commands provided from each of the first and second command storage units; a first operation control section suitable for controlling respective operations of the plurality of memory devices by providing the first group commands stored in the first command storage unit in response to the change signal having the first state; and a second operation control section suitable for controlling respective operations of the plurality of memory devices by providing the second group commands stored in the second command storage unit in response to the change signal having the second state.

The information of commands may include first and second information. The first information may include at least information on a number of the first group commands stored in the first command storage unit, and information on which one of the first group commands has the highest priority and occupies which one of the plurality of memory devices for how much time. The second information may include at least information on a number of the second group commands stored in the second command storage unit, and information on which one of the second group commands has the highest priority and occupies which one of the plurality of memory devices for how much time. The change signal generation section may determine the state of the change signal such that the plurality of memory devices operates in parallel and a command having relatively short operation time is firstly provided to the plurality of memory devices.

The change signal generation section may change the state of the change signal, which is one of the first and second states for a preset time, to the other one of the first and second states in correspondence with the first and second group commands stored in the first and second command storage units regardless of the first and second information.

Each of the first and second operation control sections may start to perform the control of the plurality of memory devices when the state of the change signal corresponds to it and the other one of the first and second operation control sections completes the control of the plurality of memory devices in correspondence with the first and second group commands stored in the first and second command storage units.

The plurality of commands may be classified into first and second types of commands. The first type of command may not require an operation completion result of the plurality of memory devices. The second type of command may require the operation completion result of the plurality of memory devices as the response thereto. Each of the first and second operation control sections may complete the control of the plurality of memory devices when it provides the plurality of memory devices with the first type of command. Each of the first and second operation control sections may complete the control of the plurality of memory devices when it provides the plurality of memory devices with the second type of command and further the change operation control unit receives the operation completion response from the plurality of memory devices.

The second type of command may include several sub-commands. Each of the first and second operation control sections may complete the control of the plurality of memory devices when each operation in response to each subcommands included in the second type of command is completed by the plurality of memory devices.

In an embodiment, a memory system may include: N (N is an integer larger than 2) number of memory devices; and a controller suitable for: dividing M (M is an integer larger than 1) number of commands applied from a host into N number of group commands according to addresses of the N number of memory devices, which is provided along with the M number of commands from the host, storing the N number of group commands in N number of command storage spaces, respectively, and alternately providing the N number of group commands to the N number of memory devices according to a preset change reference.

The controller may include a command determination unit suitable for dividing the M number of commands into the N number of group commands according to the addresses; and a change operation control unit suitable for alternately providing the N number of group commands to the N number of memory devices according to the preset change reference.

The N number of group commands may correspond to the N number of memory devices, respectively.

The change operation control unit may include a change signal generation section suitable for generating a change signal, a state of which is determined among N number of states according to the preset change reference that is determined based on information of commands provided from each of the N number of command storage spaces; and N number of operation control sections suitable for controlling respective operations of the N number of memory devices by providing the N number of group commands respectively stored in the N number of command storage units in response to the change signal the N number of states, respectively.

The information of commands may include N number of information. Each of the N number of information may include at least information on a number of a corresponding group commands stored in a corresponding command storage unit, and information on which one of the corresponding group commands has the highest priority and occupies which one of the plurality of memory devices for how much time. The change signal generation section may determine the state of the change signal such that a command having relatively short operation time is firstly provided to the plurality of memory devices.

The change signal generation section may change the state of the change signal, which is one among the N number of states for a preset time, to another one among the N number of states in correspondence with two or more among the N number of group commands stored in the N number of command storage units regardless of the N number of information.

Each of the N number of operation control sections may start to perform the control of the N number of memory devices when the state of the change signal corresponds to it and the another one among the N number of operation control sections complete the control of the plurality of memory devices in correspondence with two or more among the N number of group commands stored in the N number of command storage units.

The plurality of commands may be classified into first and second types of commands. The first type of command may not require an operation completion result of the N number of memory devices. The second type of command may require the operation completion result of the N number of memory devices as the response thereto. Each of the N number of operation control sections may complete the control of the N number of memory devices when it provides the N number of memory devices with the first type of command. Each of the N number of operation control sections may complete the control of the N number of memory devices when it provides the plurality of memory devices with the second type of command and further the change operation control unit receives the operation completion response from the N number of memory devices.

The second type of command may include several subcommands, Each of the first and second operation control sections may complete the control of the plurality of memory devices when each operation in response to each subcommands included in the second type of command is completed by the plurality of memory devices.

According to the embodiments, the commands inputted from a host are divided according to a preset division reference and are stored in different spaces, and the commands stored in the different spaces are alternately provided to a plurality of memory devices according to a preset change reference.

Through this, advantages are provided in that the commands inputted from the host may be provided to the plurality of memory devices at the most efficient timing.

Also, advantages are provided in that it is possible to minimize idle time of the plurality of memory devices.

DETAILED DESCRIPTION

Figure 1:
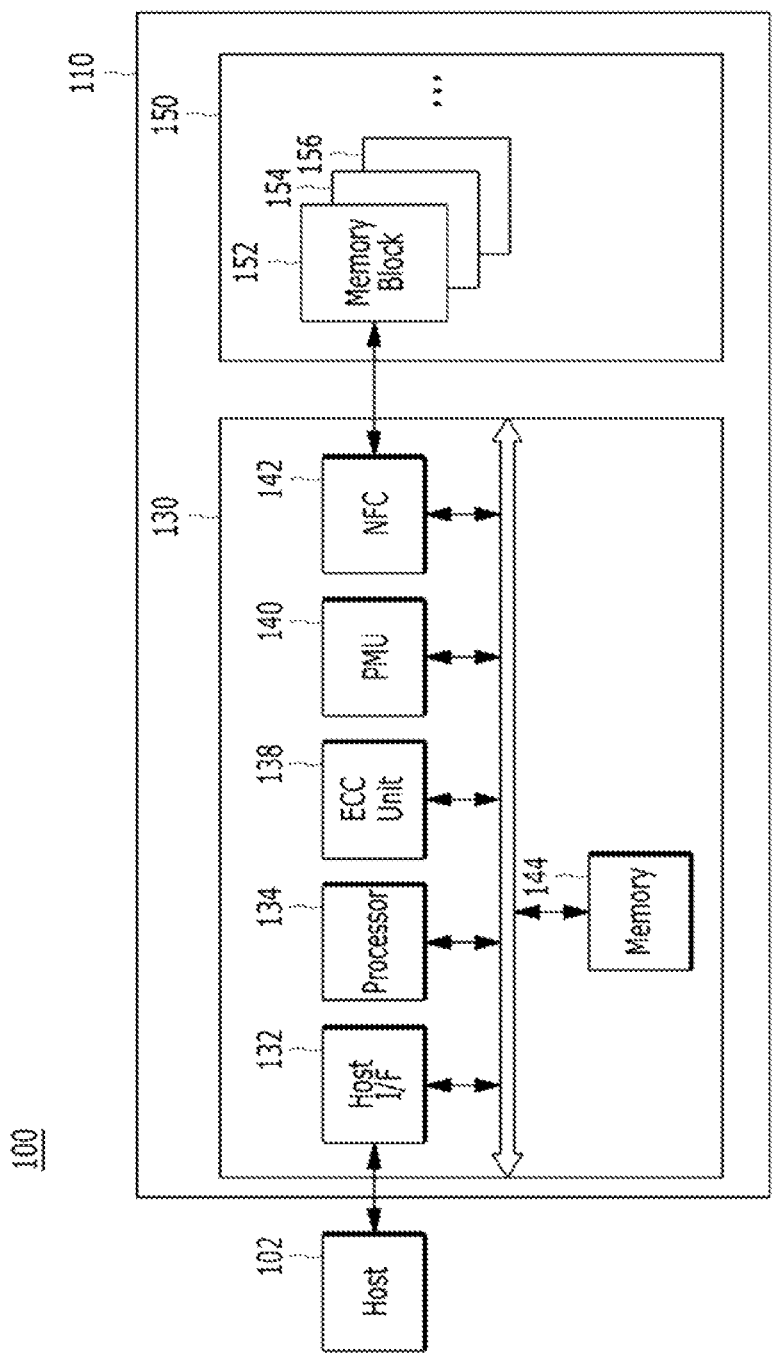
FIG. 1 is a diagram illustrating a data processing system including a memory system in accordance with an embodiment.

Various embodiments will be described below in snore detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a data processing system including a memory system in accordance with an embodiment.

Referring to FIG. 1, a data processing system 100 may include a host 102 and a memory system 110.

The host 102 may include, for example, a portable electronic device such as a mobile phone, an MP3 player and a laptop computer or an electronic device such as a desktop computer, a game player, a TV and a projector.

The memory system 110 may operate in response to a request from the host 102, and in particular, store data to be accessed by the host 102. In other words, the memory system 110 may be used as a main memory system or an auxiliary memory system of the host 102.

The memory system 110 may be implemented with any one of various kinds of storage devices, according to the protocol of a host interface to be electrically coupled with the host 102. The memory system 110 may be implemented with any one of various kinds of storage devices such as a solid state drive (SSD), a multimedia card (MMC), an embedded MMC (eMMC), a reduced size MMC (RS-MMC) and a micro-MMC a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150 which stores data to be accessed by the host 102, and a controller 130 which may control storage of data in the memory device 150.

The controller 130 and the memory device 150 may be integrated into one semiconductor device. For instance, the controller 130 and the memory device 150 may be integrated into one semiconductor device and configure a solid state drive (SSD), When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory card 150 may be integrated into one semiconductor device and configure a memory card such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, and a universal flash storage (UFS) device.

For another instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted and, in particular, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory, The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the'memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program and erase operations.

In detail, the controller 130 may include a host interface unit 132, a processor 134, an error correction code (ECC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation, The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDDC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory SRAM) or a dynamic random access memory (DRAM). As described above, the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
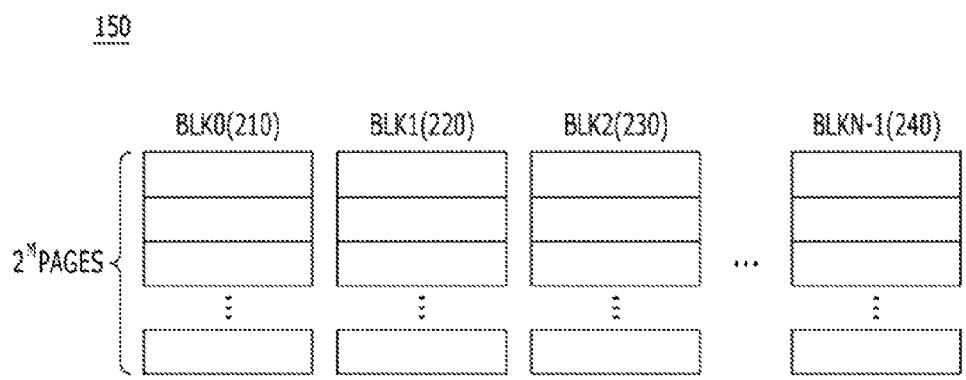
FIG. 2 is a diagram illustrating a memory device in the memory system shown in FIG. 1.

FIG. 2 is a schematic diagram illustrating the memory device 150 shown in FIG. 1.

Referring to FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
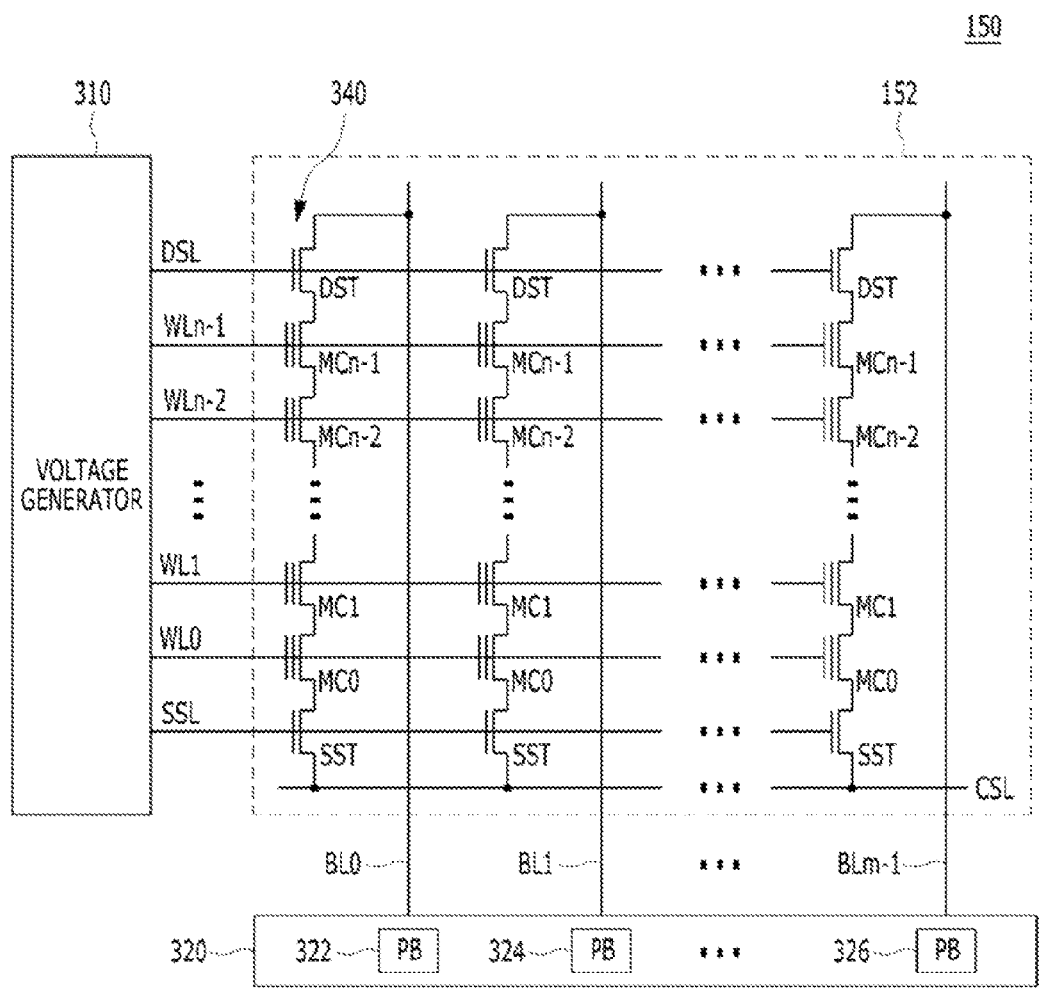
FIG. 3 is a circuit diagram illustrating a memory block in a memory device in accordance with an embodiment.

FIG. 3 is a circuit diagram illustrating one of the plurality of memory blocks 152 to 156 shown in FIG. 1.

Referring to FIG. 3, the memory block 152 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by multi-level cells (MLC) each of which stores data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, the memory block 152 which is configured by NAND flash memory cells, it is to be noted that the memory block 152 of the memory device 150 in accordance with the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagrams illustrating the memory device 150 shown in FIG. 1.

Figure 4:
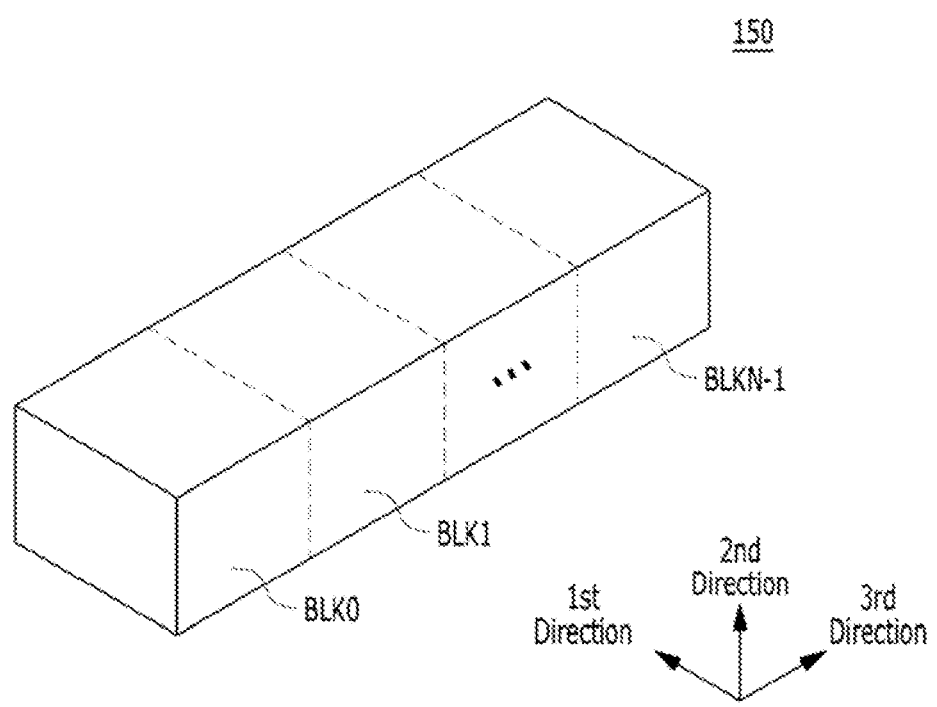
FIGS. 4 to 11 are diagrams schematically illustrating the memory device shown in FIG. 2.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. The respective memory blocks BLK0 to BLKN-1 may include structures which extend in first to third directions, for example, an x-axis direction, a y-axis direction and a z-axis direction.

The respective memory blocks BLK0 to BLKN-1 may include a plurality of NAND strings NS which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL, and a common source line CSL. Namely, the respective memory blocks BLK0 to BLKN-1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
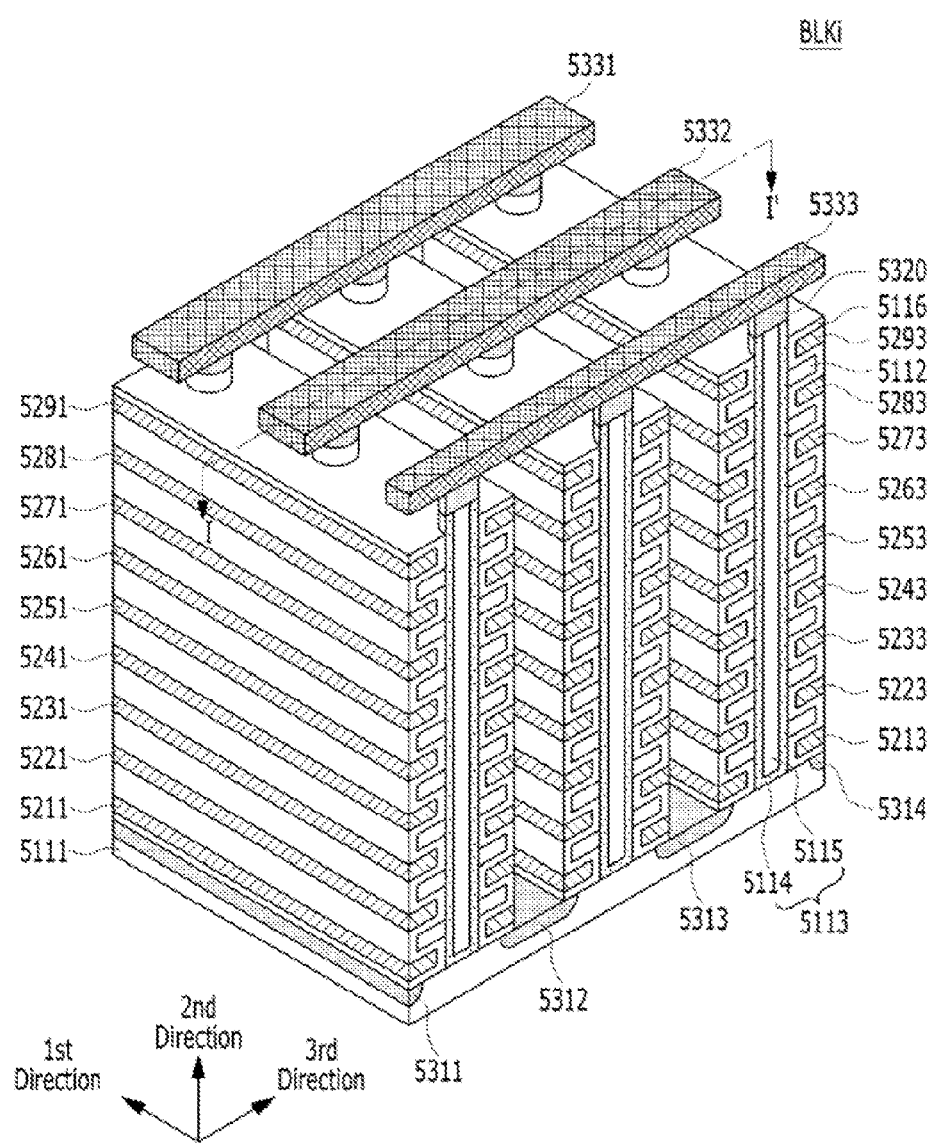
Figure 6:
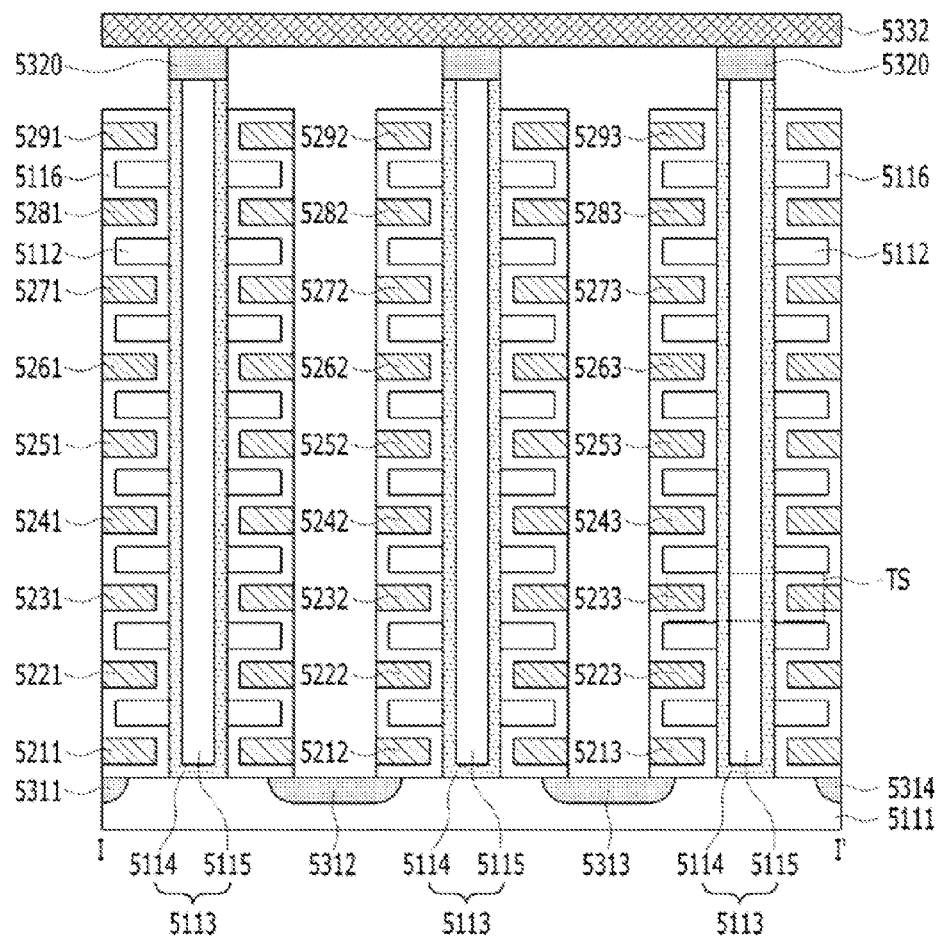

FIG. 5 is a perspective view of one BLKi of the plural memory blocks BLK0 to BLKN-1 shown in FIG. 4. FIG. 6 is a cross-sectional view taken along a line I-I' of the memory block BLKi shown in FIG. 5.

Referring to FIGS. 5 and 6, a memory block BLKi among the plurality of memory blocks of the memory device 150 may include a structure which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While it is assumed that the substrate 5111 is p-type silicon, it is to be noted that the substrate 5111 is not limited to being p-type silicon.

A plurality of doping regions 5311 to 5314 which extend in the first direction may be provided over the substrate 5111. The plurality of doping regions 5311 to 5314 may contain a second type of impurity that is different from the substrate 5111. The plurality of doping regions 5311 to 5314 may be doped with an n-type impurity. While it is assumed here that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112 which extend in the first direction may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide.

In the region over the substrate 5111 between the first and second doping regions 5311 and 5312, a plurality of pillars 5113 which are sequentially disposed in the first direction and pass through the dielectric materials 5112 in the second direction may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. In other words, a region in which a material other than the dielectric material 5112 and the dielectric layer 5116 may be disposed may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281 which extend in the first direction may be provided between the dielectric materials 5112. The conductive material 5291 which extends in the first direction may be provided over the uppermost dielectric material 5112. The conductive materials 5211 to 5291 which extend in the first direction may be a metallic material. The conductive materials 5211 to 5291 which extend in the first direction may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. For example, the width of each drain 5320 may be larger than the width of each corresponding pillar 5113. Each drain 5320 may be provided in the shape of a pad over the top surface of each corresponding pillar 5113.

Conductive materials 5331 to 5333 which extend in the third direction may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333 which extend in the third direction may be electrically coupled with through contact plugs. The conductive materials 5331 to 5333 which extend in the third direction may be a metallic material. The conductive materials 5331 to 5333 which extend in the third direction may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293 which extend in the first direction, The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
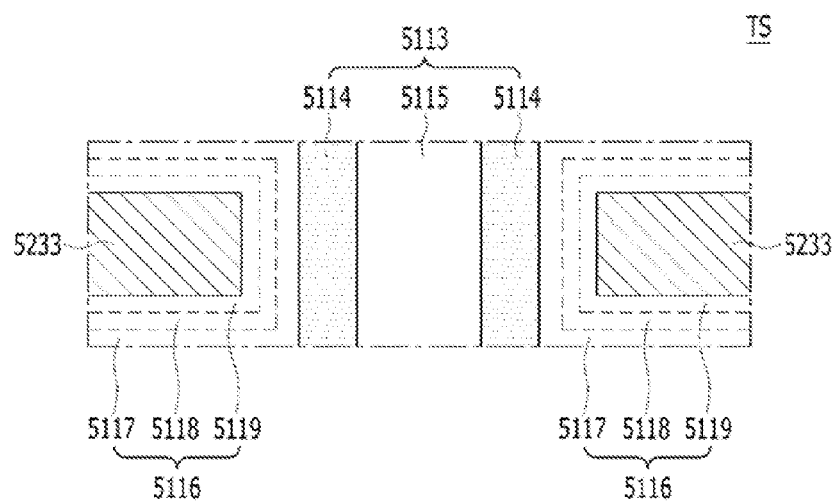

FIG. 7 is a cross sectional view of the transistor structure TS shown in FIG. 6.

Referring to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 which extends in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience, the surface layer 5114 of p-type silicon in each of the pillars 5113 will be referred to as a body in the second direction.

The memory block BLKi may include the plurality of pillars in 5113. Namely, the memory block BLKi may include the plurality of NAND strings NS. In detail, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST, At least one of the plurality of transistor structures TS of each NAND string NS may serve as a ground select transistor GST.

The gates or control gates may correspond to the conductive materials 5211 to 5291, 5212 to 5292 and 5213 to 5293 which extend in the first direction. In other words, the gates or the control gates may extend in the first direction and form word lines and at least two select lines, at least one source select line SSL and at least one ground select line GSL.

The conductive materials 5331 to 5333 which extend in the third direction may be electrically coupled to one end of the NAND strings NS. The conductive materials 5331 to 5333 which extend in the third direction may serve as bit lines BL. That is, in one memory block BLKi, the plurality of NAND strings NS may be electrically coupled to one bit line BL.

The second type doping regions 5311 to 5314 which extend in the first direction may be provided to the other ends of the NAND strings NS. The second type doping regions 5311 to 5314 which extend in the first direction may serve as common source lines CSL.

Namely, the memory block BLKi may include a plurality of NAND strings NS which extend in a direction perpendicular to the substrate 5111, e.g., the second direction, and may serve as a NAND flash memory block, for example, of a charge capturing type memory, in which a plurality of NAND strings NS are electrically coupled to one bit line BL.

While it is illustrated in FIGS. 5 to 7 that the conductive materials 5211 to 5291, 5212 to 5292 and 5213 to 5293 which extend in the first direction are provided in 9 layers, it is to be noted that the conductive materials 5211 to 5291, 5212 to 5292 and 5213 to 5293 which extend in the first direction are not limited to being provided in 9 layers. For example, conductive materials which extend in the first direction may be provided in 8 layers, 15 layers or any multiple of layers. In other words, in one NAND string NS, the number of transistors may be 8, 16 or more.

While it is illustrated in FIGS. 5 to 7 that 3 NAND strings NS are electrically coupled to one bit line BL, it is to be noted that the embodiment is not limited to having 3 NAND strings NS that are electrically coupled to one bit line BL. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
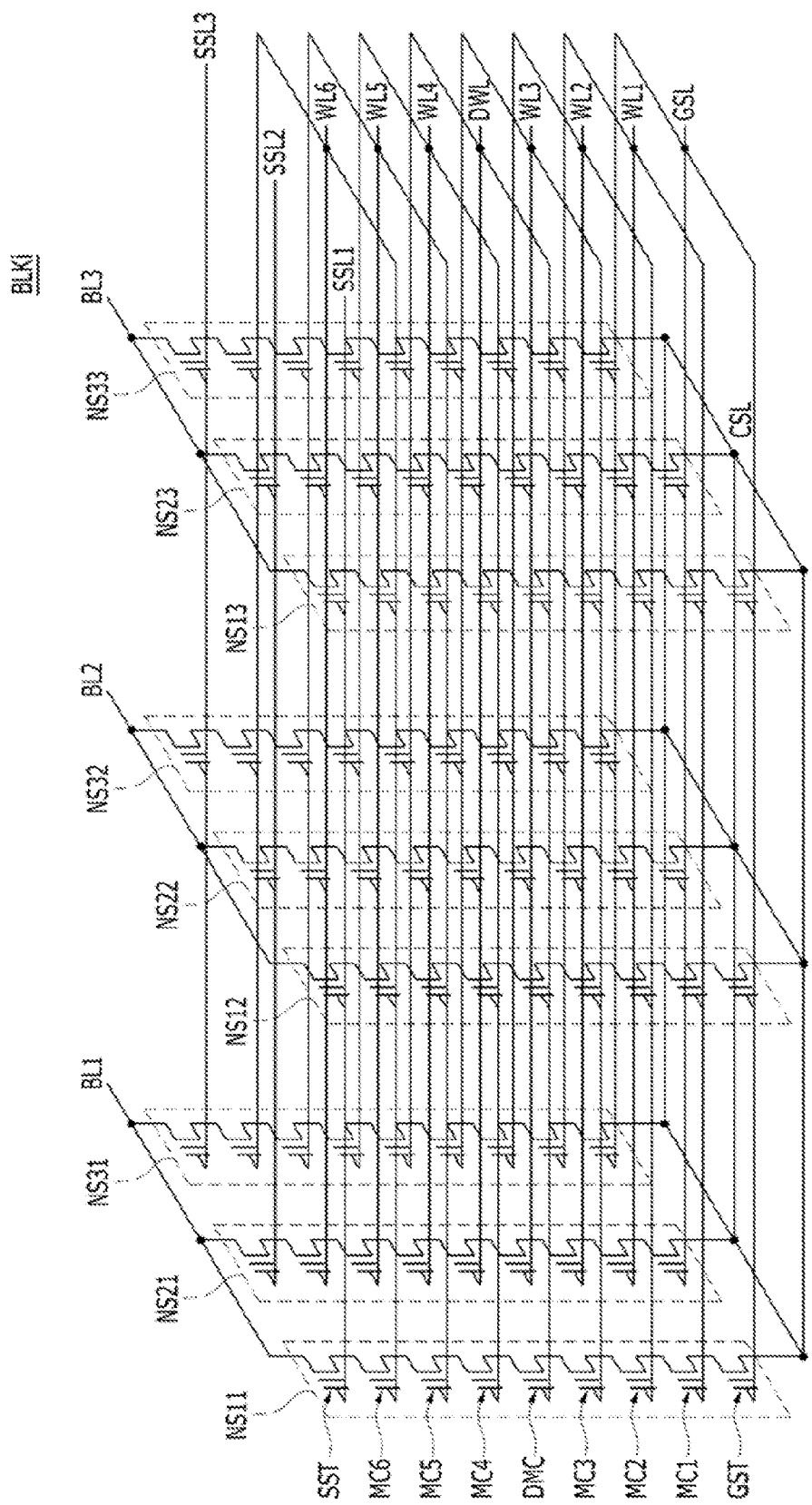

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row, the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS, a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line L. That is, at the same height, the word lines WL electrically coupled to the memory cells MC of the NAND strings NS in different rows may be electrically coupled, Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction may be electrically coupled in common to upper layers through contacts. At the upper layers, the conductive materials 5211 to 5291, 5212 to 5292 and 5213 to 5293 which extend in the first direction may be electrically coupled. In other words, the ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

Namely, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3, the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Hereinbelow, detailed descriptions will be made with reference to FIGS. 9 to 11, which show the memory device in the memory system in accordance with an embodiment implemented with a three-dimensional (3D) nonvolatile memory device different from the first structure.

Figure 9:
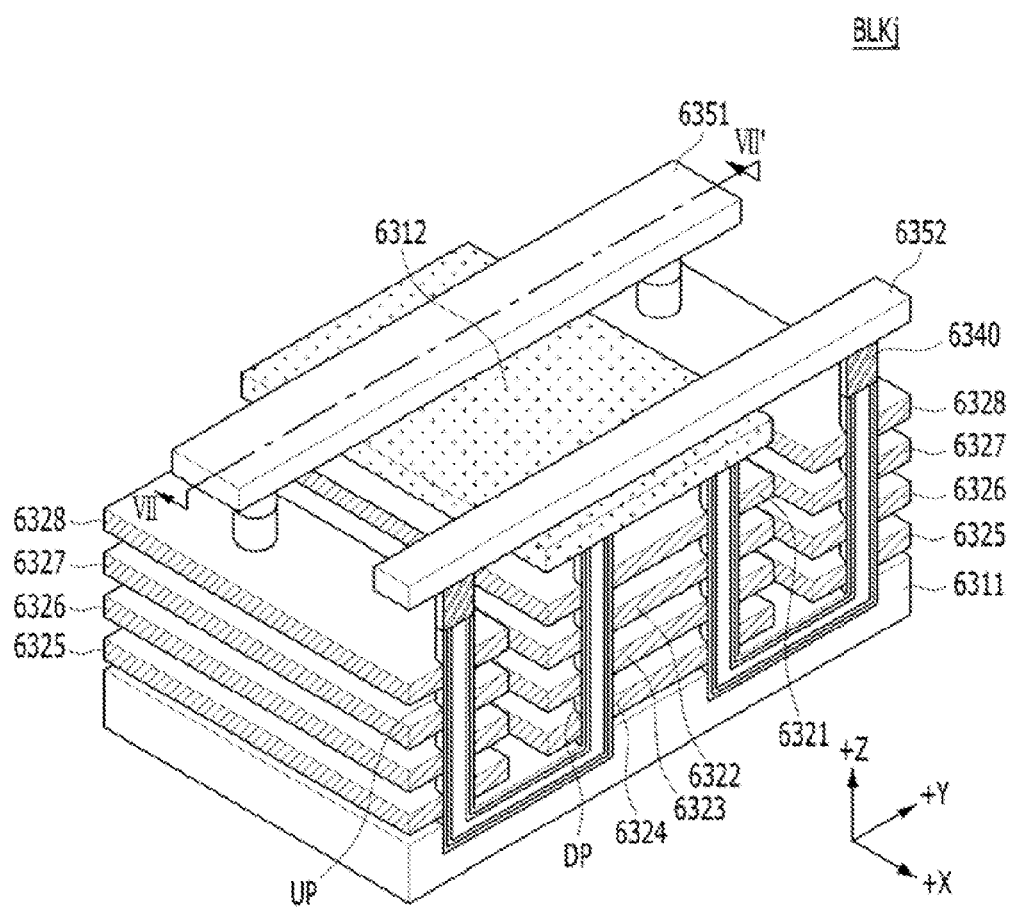
Figure 10:
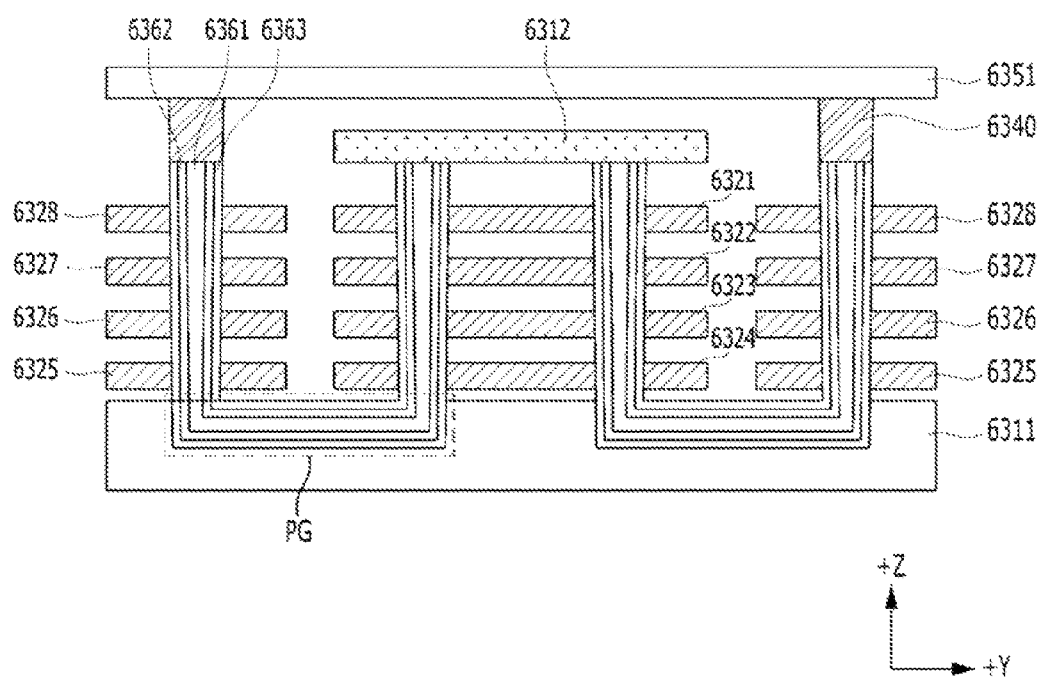

FIG. 9 is a perspective view schematically illustrating the memory device implemented with the three-dimensional (3D) nonvolatile memory device, which is different from the first structure described above with reference to FIGS. 5 to 8, and showing a memory block BLKj of the plurality of memory blocks of FIG. 4, FIG. 10 is a cross-sectional view illustrating the memory block BLKj taken along the line VII-VII' of FIG. 9.

Referring to FIGS. 9 and 10, the memory block BLKj among the plurality of memory blocks of the memory device 150 of FIG. 1 may include structures which extend in the first to third directions.

A substrate 6311 may be provided. For example, the substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment for the sake of convenience that the substrate 6311 is p-type silicon, it is to be noted that the substrate 6311 is not limited to being p-type silicon.

First to fourth conductive materials 6321 to 6324 which extend in the x-axis direction and the y-axis direction are provided over the substrate 6311. The first to fourth conductive materials 6321 to 6324 may be separated by a predetermined distance in the z-axis direction.

Fifth to eighth conductive materials 6325 to 6328 which extend in the x-axis direction and the y-axis direction may be provided over the substrate 6311. The fifth to eighth conductive materials 6325 to 6328 may be separated by the predetermined distance in the z-axis direction. The fifth to eighth conductive materials 6325 to 6328 may be separated from the first to fourth conductive materials 6321 to 6324 in the y-axis direction.

A plurality of lower pillars DP which pass through the first to fourth conductive materials 6321 to 6324 may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type which extends in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352 which extend in the y-axis direction may be provided over the drains 6340

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP form a lower string. The upper pillar UP and the fifth to eighth conductive materials 6325 to 6328 adjacent to the upper pillar UP form an upper string. The lower string and the upper string may be electrically coupled through the pipe gate PG. One end of the lower string may be electrically coupled to the doping material 6312 of the second type which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
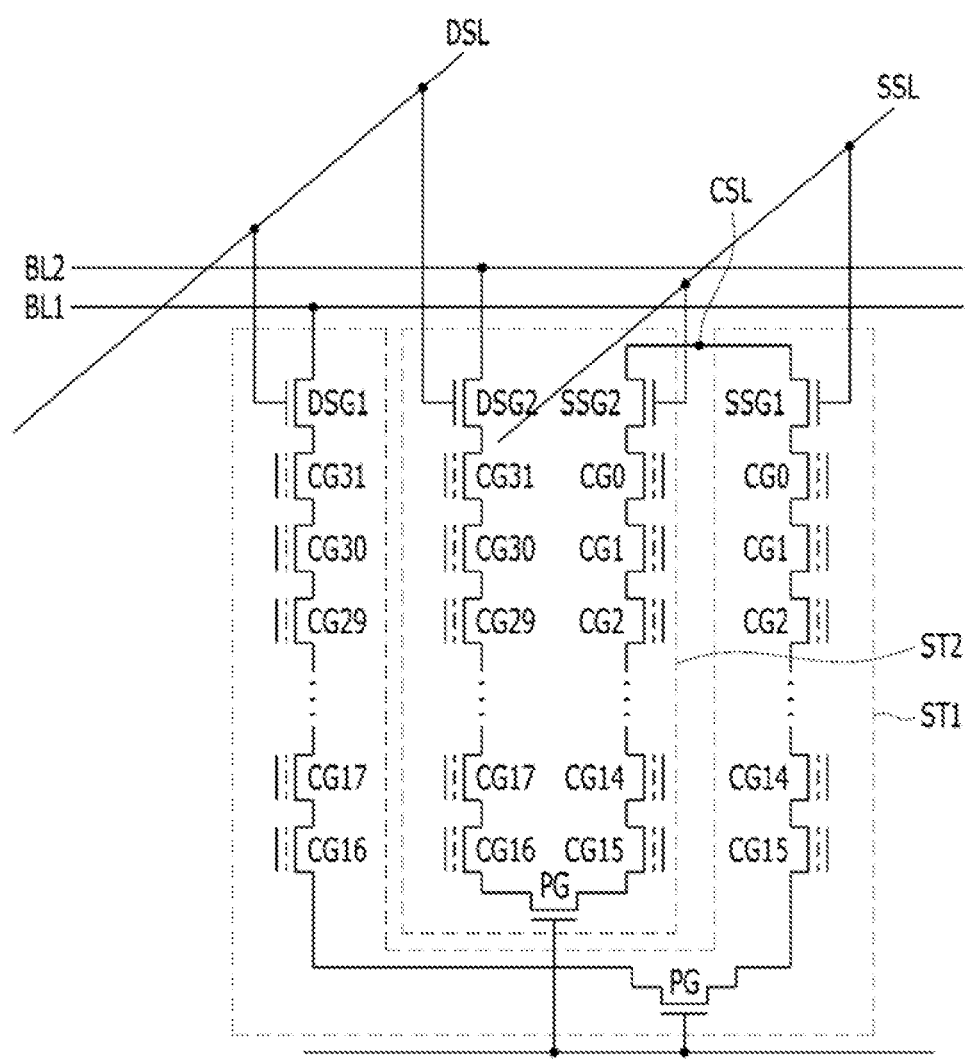

FIG. 11 is a circuit diagram illustrating the equivalent circuit of the memory block. BLKj having the second structure as described above with reference to FIGS. 9 and 10. For the sake of convenience, only a first string and a second string, which form a pair in the memory block BLKj in the second structure are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10, may be provided in such a way as to define a plurality of pairs.

Namely, in the certain memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Figure 12:
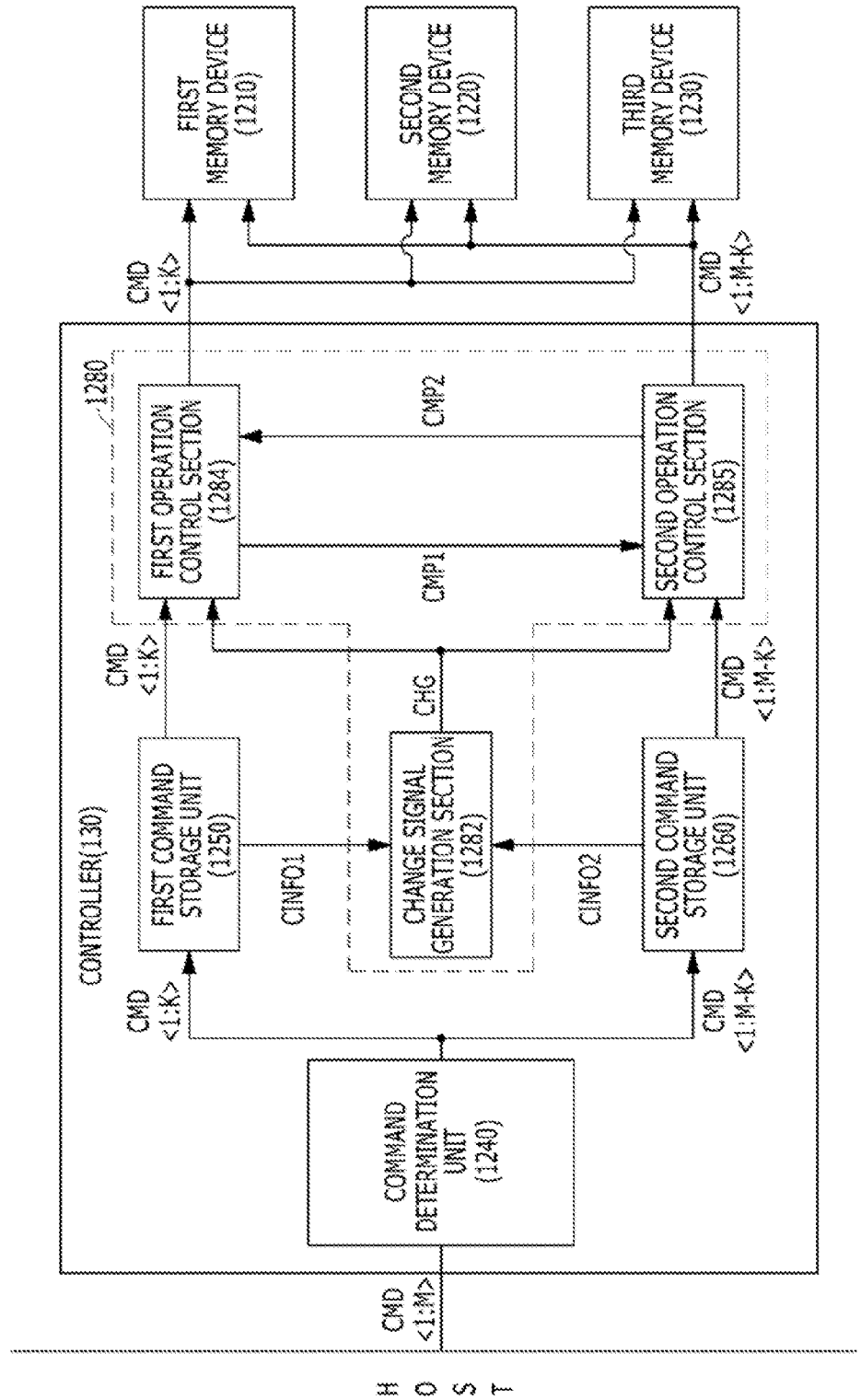
FIG. 12 is a block diagram illustrating a memory system in accordance with an embodiment.

FIG. 12 is a block diagram illustrating a memory system in accordance with an embodiment.

Referring to FIG. 12, the memory system includes a plurality of memory devices 1210 to 1230, and a controller 130. The controller 130 includes a command determination unit 1240, a first command storage unit 1250, a second command storage unit 1260, and a change operation control unit 1280. The change operation control unit 1280 includes a change signal generation section 1282, a first operation control section 1284, and a second operation control section 1285.

Each of the plurality of memory devices 1210 to 1230 represents the memory device 150 of the memory system shown in FIG. 1. While it is shown in FIG. 12 that three memory devices 1210 to 1230 are included, a larger or smaller number of memory devices may also be included. The command determination unit 1240, the first command storage unit 1250, the second command storage unit 1260 and the change operation control unit 1280 included in the controller 130 may be included in the processor 134 of the controller 130 shown in FIG. 1, which may vary according to a designer's choice.

The controller 130 may divide a plurality of commands CMD<1:M> applied from a host HOST into first group commands CMD<1:K> and second group commands CMD<1:M−K> and may store the first and second group commands CMD<1:K> and CMD<1:M−K> in the first and second command storage units 1250 and 1260, respectively.

The command determination unit 1240 may divide the plurality of commands CMD<1:M> into the first group commands CMD<1:K> and the second group commands CMD<1:M−K> according to the preset division reference.

The first group commands CMD<1:K may include commands which do not change the physical status of data in the plurality of memory devices 1210 to 1230. For example, the first group commands CMD<1:K> may include commands for reading the data stored in the plurality of memory devices 1210 to 1230.

The second group commands CMD<1:M−K> may include commands which change the physic& status of data in the plurality of memory devices 1210 to 1230. For example, the second group commands CMD<1:M−K> may include commands for writing and erasing data in the plurality of memory devices 1210 to 1230. Further, the second group commands CMD<1:M−K> may include commands for changing the status of the data stored in the plurality of memory devices 1210 to 1230, such as a garbage collection command, a wear leveling command and a bad block management command.

The first command storage unit 1250 stores the first group commands CMD<1:K>. While the first command storage unit 1250 may store the first group commands CMD<1:K> in the first-in-first-out (FIFO) basis, the first command storage unit 1250 may also store the first group commands CMD<1:K> in a priority basis. For the priority basis, a command reordering component (not shown) for controlling storage order of the first group commands CMD<1:K> may be added according to a designer's choice.

The second command storage unit 1260 may store the second group commands CMD<1:M−K> in the same way as the first command storage unit 1250.

The change operation control unit 1280 controls the respective operations of the plurality of memory devices 1210 to 1230 by selecting one among the first group commands CMD<1:K> and the second group commands CMD<1:M−K> according to the preset change reference. The change operation control unit 1280 may selectively provide the plurality of memory devices 1210 to 1230 with one of the commands of the first and second group commands CMD<1:K> and CMD<1:M−K> so as to control the respective operations of the plurality of memory devices 1210 to 1230.

The change signal generation section 1282 generates a change signal CHG having one of first and second states according to the preset change reference that is determined based on first and second command information CINFO1 and CINFO2 provided from the first and second command storage units 1250 and 1260, respectively.

The first command information CINFO1 may include information on the number of the first group commands CMD<1:K> stored in the first command storage unit 1250, information on which one of the first group commands CMD<1:K> has the highest order or priority, and occupies which one of the plurality of memory devices 1210 to 1230 for how much time, and so forth.

The second command information CINFO2 may include the same kind of information for the second group commands CMD<1:M−K> as the first command information CINFO1.

For reference, according to a designer's choice, any additional information may be included in the first and second command information CINFO1 and CINFO2 besides the above-described information. For example, information on operation times for the first and second group commands CMD<1:K> and CMD<1:M−K> stored in the first and second command storage units 1250 and 1260 may be added to the first and second command information CINFO1 and CINFO2, respectively.

The change signal generation section 1282 determines the state of the change signal CHG by combining the first and second command information CINFO1 and CINFO2, such that the plurality of memory devices 1210 to 1230 operates in parallel and a command having relatively short operation time is firstly provided to the plurality of memory devices 1210 to 1230.

Parallel operation of the plurality of memory devices 1210 to 1230 means that the plurality of memory devices 1210 to 1230 perform operations in response to the first and second group commands CMD<1:K> and CMD<1:M-K> in the pipelining basis in which different memory devices perform operations in response to different commands at a time in order to reduce idle time of the plurality of memory devices 1210 to 1230.

For example, when the first memory device 1210 is performing one or more operations in response to the first group commands CMD<1:K> and the second and third memory devices 1220 and 1230 are idle at a current time and when a command to be provided next among the second group commands CMD<1:M-K> is for the first memory device 1210 and a command to be provided next time among the first group commands CMD<1:K> is for the second memory device 1220,, the change signal generation section 1282 may keep the change signal CHG representing the first group commands CMD<1:K> such that the second memory device 1220 may perform operations in response to the first group commands CMD<1:K>. Namely, because the first memory device 1210 is performing operations at the current time, any other command for the first memory device 1210 may not be immediately performed even though it is selected. However, because the second memory device 1220 is idle at the current time, the second memory device 1220 may perform operations in parallel with the first memory device 1210 when a command for the second memory device 1220 or a command of the first group commands CMD<1:K> is selected. Therefore, in the present example, the change signal generation section 1282 may keep the change signal CHG representing the first group commands CMD<1:K> such that the second memory device 1220 may perform operations in response to the first group commands CMD<1:K> while the first memory device 1210 is performing operations.

For another example, when the first and second memory devices 1210 and 1220 are performing one or more operations in response to the first group commands CMD<1:K> and the third memory device 1230 is idle at a current time and the remaining operation time of the first and second memory devices 1210 and 1220 is 1 and 2 ms, respectively, and when a command to be provided a time among the second group commands CMD<1:M-K> is for the first memory device 1210 which requires a processing time of 1 ms and a command to be provided next among the first group commands CMD<1:K> is for the second memory device 1220 which requires a processing time of 1 ms, the change signal generation section 1282 may change the state of the change signal CHG to represent the second group commands CMD<1:M-K> such that the first memory device 1210 may perform operations in response to the second group commands CMD<1:M-K>. Namely, when next command is one of the first group commands CMD<1:K>, total operation time of the second memory device 1220 for the current next command may be 3 ms. However, when next command is one of the second group commands CMD<1:M-K>, total operation time of the first memory device 1210 for the current and right next command may be 2 ms. As a consequence, in the present example, it may be more effective to change the state of the change signal CHG and provide a command of the second group commands CMD<1:M-K>.

The change signal generation section 1282 changes the state of the change signal CHG, which is one of the first and second states for a preset time, to the other one regardless of the first and second command information CINFO1 and CINFO2. For example, when the preset time passes after the change signal CHG is changed to the first state, the change signal generation section 1282 changes the change signal CHG to the second state by compulsion even though the first and second command information CINFO1 and CINFO2 represent the current state of the change signal CHG.

The compulsory state change of the change signal CHG may allow the plurality of memory devices 1210 to 1230 to perform operations evenly in response to the first and second group commands CMD<1:K> and CMD<1:M-K>. The compulsory state change may prevent long waiting time of the host HOST for the operation result of the plurality of memory devices 1210 to 1230 in response to one of the first and second group commands CMD<1:K> and CMD<1:M-K>.

For reference, conditions according to which change signal generation section 1282 changes the state of the change signal CHG may vary according to a designer's choice as far as the plurality of memory devices 1210 to 1230 are respectively controlled to have minimum idle times.

The first: operation control section 1284 controls the respective operations of the plurality of memory devices 1210 to 1230 by providing the plurality of memory devices 1210 to 1230 with the first group commands CMD<1:K> stored in the first command storage unit 1250 when the change signal CHG is the first state.

The second operation control section 1285 controls the respective operations of the plurality of memory devices 1210 to 1230 by providing the plurality of memory devices 1210 to 1230 with the second group commands CMD<1:M-K> stored in the second command storage unit 1260 when the change signal CHG is the second state.

The first and second operation control sections 1284 and 1285 may output first and second operation completion signals CMP1 and CMP2 to each other when they complete their own current operations, respectively.

Each of the first and second operation control sections 1284 and 1285 may start to perform its operation when the state of the change signal CHG corresponds to it and it receives the first and second operation completion signals CMP1 and CMP2 from the other one of the first and second operation control sections 1284 and 1285.

When each of the first and second operation control sections 1284 and 1285 completes its current operation may depend on the type of command that it provides to the plurality of memory devices 1210 to 1230, A first type of command may not require an operation completion result of the plurality of memory devices 1210 to 1230 as a response thereto. A second type of command may require the operation completion result of the plurality of memory devices 1210 to 1230 as the response thereto. Each of the first and second operation control sections 1284 and 1285 may complete its current operation when it provides the plurality of memory devices 1210 to 1230 with the first type of command. Each of the first and second operation control sections 1284 and 1285 may complete its current operation when it provides the plurality of memory devices 1210 to 1230 with the second type of command and further the change operation control unit 1280 receives the operation completion response from the plurality of memory devices 1210 to 1230.

For example, the write and read commands may be the first type of commands while the update command for the mapping table of logical addresses and physical addresses for the third memory device 1230 may be the second type of commands. In this case, each of the first and second operation control sections 1284 and 1285 may complete its current operation of providing the write or read command to the plurality of memory devices 1210 to 1230 when it provides the plurality of memory devices 1210 to 1230 with the write or read command without requiring the operation completion result from the plurality of memory devices 1210 to 1230. On the other hand, each of the first and second operation control sections 1284 and 1285 may complete its current operation of providing the update command for the mapping table to the plurality of memory devices 1210 to 1230 when it provides the plurality of memory devices 1210 to 1230 with the update command for the mapping table and further the change operation control unit 1280 receives the operation completion response, which represent the idle state of the plurality of memory devices 1210 to 1230, from the plurality of memory devices 1210 to 1230.

For example, the operation of the second operation control section 1285 for the first and second memory devices 1210 and 1220 is completed when the write command is transferred to the first and second memory devices 1210 and 1220 and the first and second memory devices 1210 and 1220 start the write operations. Therefore, even after the second operation control section 1285 completes its operation, the first and second memory devices 1210 and 1220 are performing the write operations and these states of the ongoing write operations correspond to the remaining operation times of the first and second memory devices 1210 and 1220. For example, the remaining operation times of the first and second memory devices 1210 and 1220 are transferred to the change operation control unit 1280 and are used as information for subsequently controlling the first and second memory devices 1210 and 1220.

For example, the operation of the second operation control section 1285 for the third memory device 1230 is completed when the update command for the mapping table for the third memory device 1230 is transferred to the third memory device 1230 and the third memory device 1230 provides the operation completion response representing the idle state of the third memory device 1230, to the change operation control unit 1280. Therefore, after the operation of the second operation control section 1285 for the third memory device 1230 is completed, the third memory device 1230 enters the idle state, and this situation is reported to the change operation control unit 1280 and is used as information for subsequently controlling the third memory device 1230.

Figure 14:
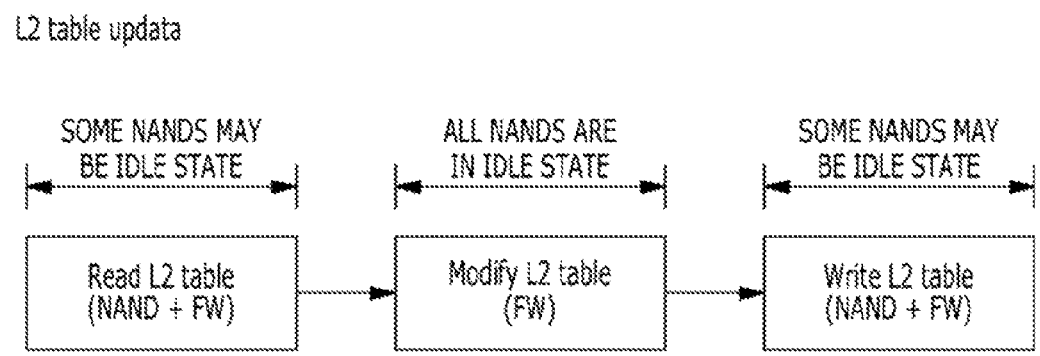
FIG. 14 is a diagram illustrating an example of a single command having several subcommands.

The second type of command may be executed through several subcommands as exemplified in FIG. 14, and each of the first and second operation control sections 1284 and 1285 may complete its operation of providing the command when each operation in response to each subcommands included the second type of command is completed by the plurality of memory devices 1210 to 1230.

FIG. 14 is a diagram illustrating an example of a single command having several subcommands.

For example, the update command for the mapping table of logical addresses and physical addresses as the second type of command may include first to third subcommands. The first subcommand may represent reading of the mapping table from a memory device and storing the mapping table in a cache memory ("Read L2 table" in FIG. 14). The second subcommand may represent changing of values of the mapping table stored in the cache memory ("Modify L2 table" in FIG. 14). The third subcommand may represent storing of the changed mapping table in the memory device ("Write L2 table" in FIG. 14). Each operation in response to each of the first to third subcommands may be independent from and may not affect other operations in response to the other first to third subcommands. For example, the operations in response to the second and third subcommands ("Modify L2 table" and "Write L2 table" in FIG. 14) may not be performed right after the operation in response to the first subcommand ("Read L2 table" in FIG. 14) is completed. For example, the operations in response to the third subcommand ("Write L2 table" in FIG. 14) may not be performed right after the operation in response to the second subcommand ("Modify L2 table" in FIG. 14) is completed. In this case, the remaining operations for the completion of the second type of command having several subcommands may be performed at a subsequent time when each of the first and second operation control sections 1284 and 1285 starts to operate.

Figure 13:
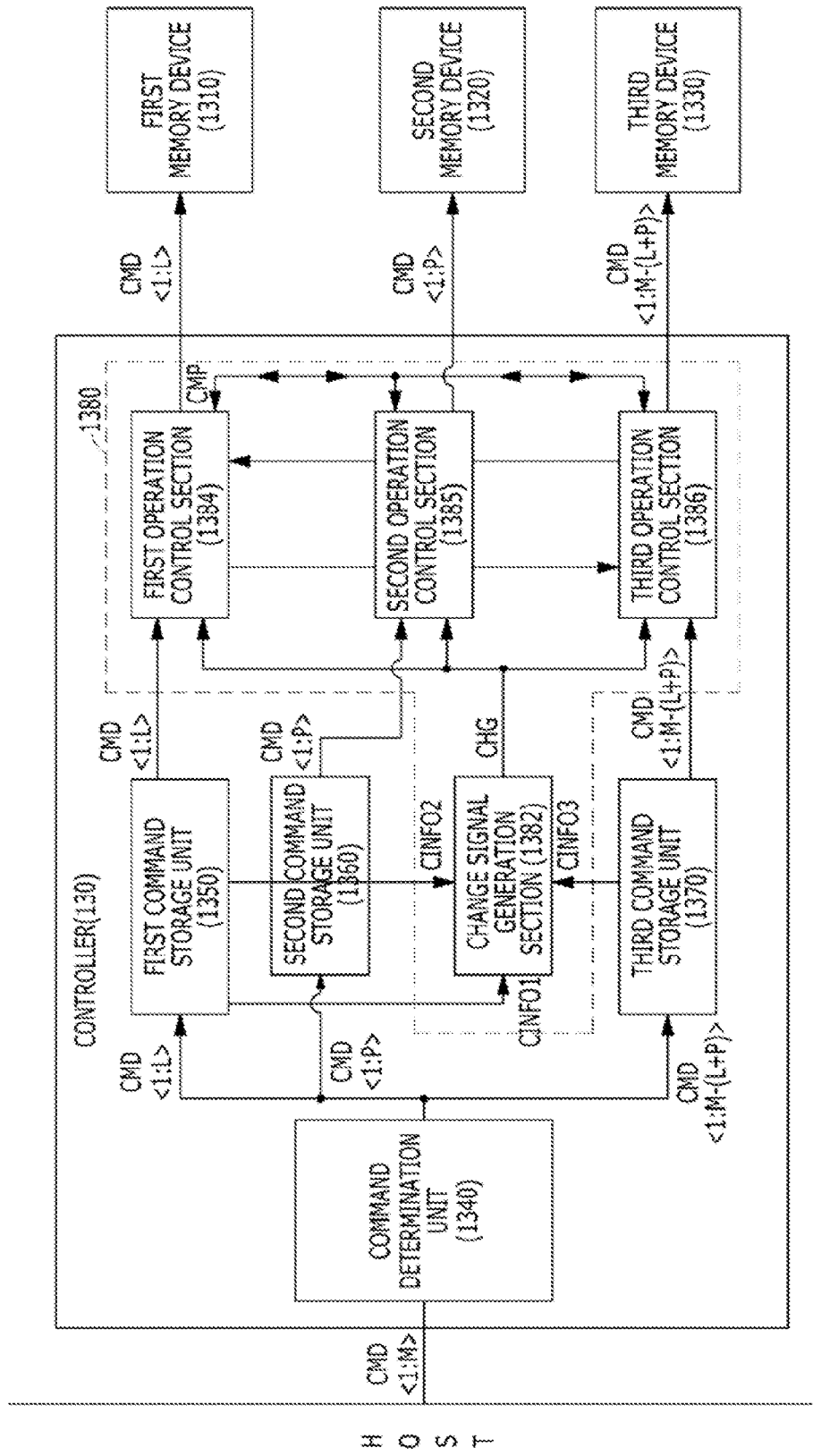
FIG. 13 is a block diagram illustrating a memory system in accordance with another embodiment.

FIG. 13 is a block diagram illustrating a memory system in accordance with another embodiment.

Referring to FIG. 13, the memory system in accordance with another embodiment includes a plurality of memory devices 1310 to 1330, and a controller 130. The controller 130 includes a command determination unit 1340, a first command storage unit 1350, a second command storage unit 1360, a third command storage unit 1370, and a change operation control unit 1380. The change operation control unit 1380 includes a change signal generation section 1382, a first operation control section 1384, a second operation control section 1385, and a third operation control section 1386.

Each of the plurality of memory devices 1310 to 1330 represents the memory device 150 of the memory system shown in FIG. 1. While it is shown in FIG. 13 that three memory devices 1310 to 1330 are included, a larger or smaller number of memory devices may also be included. The command determination unit 1340, the first command storage unit 1350, the second command storage unit 1360, the third command storage unit 1370 and the change operation control unit 1380 included in the controller 130 may be included in the processor 134 of the controller 130 shown in FIG. 1, which may vary according to a designer's choice.

The controller 130 may divide M number of commands CMD<1:M> applied from a host HOST into 3 group commands CMD<1:L>, CMD<1:P> and CMD<1:M−L−P>, and may store the first to third group commands CMD<1:L>, CMD<1:P> and CMD<1:M−L−P> in the first to third command storage units 1350 to 1370, respectively. The number of group commands CMD<1:L>, CMD<1:P> and CMD<1:M−L−P>, the number of operation control sections 1384 to 1386 and the number of command storage units 1350 to 1370 may depend on the number of memory devices 1310 to 1330.

The command determination unit 1340 may divide the M number of commands CMD<1:M> into the first to third group commands CMD<1:L>, CMD<1:P> and CMD<1:M−L−P> according to the address of the memory devices 1310 to 1330, which is provided along with the commands CMD<1:M> from the host HOST.

For example, the first to third group commands CMD<1:L>, CMD<1:P> and CMD<1:M−L−P> may include commands provided with the addresses of the first to third memory devices 1310 to 1330, respectively.

The first command storage unit 1350 stores the first group commands CMD<1:L> in the command determination unit 1340. While the first command storage unit 1350 may store the first group commands CMD<1:L> in the first-in-first-out (FIFO) basis, the first command storage unit 1350 may also store the first group commands CMD<1:L> in a priority basis. For the priority basis, a command reordering component (not shown) for controlling storage order of the first group commands CMD<1:L> may be added according to a designer's choice.

Each of the second and third command storage unit 1360 and 1370 may store the second and third group commands CMD<1:P> and CMD<1:M−L−P> in the same ay as the first command storage unit 1350.

The change operation control unit 1380 controls the respective operations of the plurality of memory devices 1310 to 1330 by selecting one among the first to third group commands CMD<1:L>, CMD<1:P> and CMD<1:M−L−P> according to the preset change reference. The change operation control unit 1380 may selectively provide the plurality of memory devices 1310 to 1330 with one of the commands of the first to third group commands CMD<1:L>, CMD<1:P> and CMD<1:M−L−P> to control the respective operations of the plurality of memory devices 1310 to 1330.

The change signal generation section 1382 generates a change signal CHC having one of first to third states according to the preset change reference that is determined based on first to third command information CINFO1 to CINFO3 provided from the first to third command storage units 1350 to 1370, respectively.

The first command information CINFO1 may include information on the number of the first group commands CMD<1:L> stored in the first command storage unit 1350, information on which one of the first group commands CMD<1:L> has the highest order or priority, and occupies which one of the plurality of memory devices 1310 to 1330 for how much time, and so forth.

The second and third command information CINFO2 and CINFO3 may include the same kind of information for the second and third group commands CMD<1:P> and CMD<1:M−L−P> as the first command information CINFO1.

For reference, according to the designer choice, any additional information may be included in the first to third command information CINFO1 to CINFO3 besides the above-described information. For example, information on operation times for the first to third group commands CMD<1:L>, CMD<1:P> and CMD<1:M−L−P> stored in the first to third storage spaces 1310 to 1330 may be added to the first to third command information CINFO1 to CINFO3, respectively.

The change signal generation section 1382 determines the state of the change signal CHG by combining the first to third command information CINFO1 to CINFO3, such that a command having relatively short operation time is firstly provided to the plurality of memory devices 1310 to 1330.

For example, when the first memory device 1310 is performing one or more operations in response to the first group commands CMD<1:L> and the second and third memory devices 1320 and 1330 are idle at a current time and when an operation time of the second memory device 1320 in response to a command to be provided next among the second group commands CMD<1:P> is 1 ms and a operation time of the third memory device 1330 in response to a command to be provided next among the third group commands CMD<1:M−L−P> is 1.5 ms, the change signal generation section 1382 may change the state of the change signal CHG to represent the second group commands CMD<1:P> such that the second memory device 1320 may perform operations in response to the second group commands CMD<1:P>.

The change signal generation section 1382 changes the state of the change signal CHG, which is one among the first to third states for a preset time, to the another one among the first to third states in correspondence with the first to third group commands CMD<1:L>, CMD<1:P> and CMD<1:M−L−P> stored in the first to third storage spaces 1310 to 1330 regardless of the first to third command information CINFO1 to CINFO3. For example, when the preset time passes after the change signal CHG is changed to the first state, the change signal generation section 1382 changes the change signal CHG to one of the second and third states by compulsion even though the first to third command information CINFO1 to CINFO3 represent the current state of the change signal CHG.

The compulsory state change of the change signal CHG may allow the plurality of memory devices 1310 to 1330 to perform operations evenly in response to the first to third group commands CMD<1:L>, CMD<1:P> and CMD<1:M−L−P>. The compulsory state change may prevent long waiting times of the host HOST for the operation result of the plurality of memory devices 1310 to 1330 in response to one of the first to third group commands CMD<1:L>, CMD<1:P> and CMD<1:M−L−P>.

For reference, conditions for which the change signal generation section 1382 changes the state of the change signal CHG may vary according to a designer's choice as far as the plurality of memory devices 1310 to 1330 are respectively controlled to have minimum idle times.

The first to third operation control sections 1384 to 1386 control the operations of the first to third memory devices 1310 to 1330 through the first to third group commands CMD<1:L>, CMD<1:P> and CMD<1:M−L−P> stored in the first to third command storage units 1350, 1360 and 1370 in response to the first to third states of the change signal CHG, respectively.

The first to third operation control sections 1384 to 1386 may output first to third operation completion signals CMP1 to CMP3 to another one when they complete their own current operations, respectively.

Similar to the embodiment described with reference to FIG. 12, each of the first to third operation control sections 1384 to 1386 may start to perform its operation when the state of the change signal CHG corresponds to it and it receives the first to third operation completion signals CMP1 to CMP3 from the other one of the first to third operation control sections 1384 to 1386 in correspondence with two or more among the first to third group commands stored in the first to third command storage units 1350 to 1370.

The first and second types of command, which are described with reference to FIGS. 12 and 14, may also be applied to the present embodiment of FIG. 13.

As is apparent from the above descriptions, according to the embodiments, the commands inputted from a host are divided according to a preset division reference and are stored in different spaces, and the commands stored in the different spaces are alternately provided to a plurality of memory devices according to a preset change reference.

Through this, the commands inputted from the host may be provided to the plurality of memory devices with the most efficient timing.

Also, it is possible to minimize the idle time of the plurality of memory devices.

Although various embodiments have been described for illustrative purposes, it will be apparent to those skilled in the art that various changes and modifications may be made without departing from the spirit and scope of the invention as defined in the following claims.

For instance, positions and types of logic gates and transistors described in the above embodiments can be differently realized depending on the polarities of the signals inputted thereto as well as other factors.

What is claimed is:

1. A memory system comprising:
a plurality of memory devices; and
a controller suitable for:
dividing a plurality of commands applied from a host into first and second group commands according to a preset division reference,
storing first and second group commands in first and second storage spaces, respectively, and
alternately providing the first and second group commands to the plurality of memory devices according to a preset change reference.

2. The memory system according to claim 1, wherein the controller comprises:
a command determination unit suitable for dividing the plurality of commands into the first and second group commands according to the preset division reference; and
a change operation control unit suitable for alternately providing the first and second group commands to the plurality of memory devices according to the preset change reference.

3. The memory system according to claim
wherein the first group commands include one or more commands which do not change physical status of data in the plurality of memory devices, and
wherein the second group commands include one or more commands which change the physical status of data in the plurality of memory devices.

4. The memory system according to claim 2,
wherein the first group commands include one or more commands for reading the data stored in the plurality of memory devices, and
wherein the second group commands include one or more commands for writing and erasing data in the plurality of memory devices.

5. The memory system according to claim 2, wherein the change operation control unit comprises:
a change signal generation section suitable for generating a change signal, a state of which is determined between first and second states according to the preset change reference that is determined based on information of commands provided from each of the first: and second command storage units;
a first operation control section suitable for controlling respective operations of the plurality of memory devices by providing the first group commands stored in the first command storage unit in response to the change signal having the first state; and
a second operation control section suitable for controlling respective operations of the plurality of memory devices by providing the second group commands stored in the second command storage unit in response to the change signal having the second state.

6. The memory system according to claim 5,
wherein the information of commands includes first and second information,
wherein the first information includes at least information on a number of the first group commands stored in the first command storage unit, and information on which one of the first group commands has the highest priority and occupies which one of the plurality of memory devices for how much time,
wherein the second information includes at least information on a number of the second group commands stored in the second command storage unit, and information on which one of the second group commands has the highest priority and occupies which one of the plurality of memory devices for how much time, and
wherein the change signal generation section determines the state of the change signal such that the plurality of memory devices operates in parallel and a command having relatively short operation time is firstly provided to the plurality of memory devices.

7. The memory system according to claim 6, wherein the change signal generation section changes the state of the change signal, which is one of the first and second states for a preset time, to the other one of the first and second states in correspondence with the first and second group commands stored in the first and second command storage units regardless of the first and second information.

8. The memory system according to claim 5, wherein each of the first and second operation control sections starts to perform the control of the plurality of memory devices when the state of the change signal corresponds to it and the other one of the first and second operation control sections completes the control of the plurality of memory devices in correspondence with the first and second group commands stored in the first and second command storage units.

9. The memory system according to claim 8,
wherein the plurality of commands are classified into first and second types of commands,
wherein the first type of command does not require an operation completion result of the plurality of memory devices,
wherein the second type of command requires the operation completion result of the plurality of memory devices as the response thereto,
wherein each of the first and second operation control sections complete the control of the plurality of memory devices when it provides the plurality of memory devices with the first type of command, and
wherein each of the first and second operation control sections completes the control of the plurality of memory devices when it provides the plurality of memory devices with the second type of command and further the change operation control unit receives the operation completion response from the plurality of memory devices.

10. The memory system according to claim 9,
wherein the second type of command includes several subcommands, and
wherein each of the first and second operation control sections completes the control of the plurality of memory devices when each operation in response to each subcommand included in the second type of command is completed by the plurality of memory devices.

11. A memory system comprising:
N (N is an integer larger than 2) number of memory devices; and
a controller suitable for:
dividing M (M is an integer larger than 1) number of commands applied from a host into N number of group commands according to addresses of the N number of memory devices, which is provided along with the M number of commands from the host, storing the N number of group commands in N number of command storage spaces, respectively, and alternately providing the N number of group commands to the N number of memory devices according to a preset change reference.

12. The memory system according to claim 11, wherein the controller comprises:

a command determination unit suitable for dividing the M number of commands into the N number of group commands according to the addresses; and a change operation control unit suitable for alternately providing the N number of group commands to the N number of memory devices according to the preset change reference.

13. The memory system according to claim 12, wherein the N number of group commands correspond to the N number of memory devices, respectively.

14. The memory system according to claim 12, wherein the change operation control unit comprises:

a change signal generation section suitable for generating a change signal, a state of which is determined among N number of states according to the preset change reference that is determined based on information of commands provided from each of the N number of command storage spaces; and N number of operation control sections suitable for controlling respective operations of the N number of memory devices by providing the N number of group commands respectively stored in the N number of command storage units in response to the change signal of the N number of states, respectively.

15. The memory system according to claim 14, wherein the information of commands includes N number of information, wherein each of the N number of information includes at least information on a number of a corresponding group commands stored in a corresponding command storage unit, and information on which one of the corresponding group commands has the highest priority and occupies which one of the plurality of memory devices for how much time, and wherein the change signal generation section determines the state of the change signal such that a command having relatively short operation time is firstly provided to the plurality of memory devices.

16. The memory system according to claim 15, wherein the change signal generation section changes the state of the change signal, which is one among the N number of states for a preset time, to another one among the N number of states in correspondence with two or more among the N number of group commands stored in the N number of command storage units regardless of the N number of information.

17. The memory system according to claim 14, wherein each of the N number of operation control sections starts to perform the control of the N number of memory devices when the state of the change signal corresponds to it and the other one among the N number of operation control sections complete the control of the plurality of memory devices in correspondence with two or more among the N number of group commands stored in the N number of command storage units.

18. The memory system according to claim 17, wherein the plurality of commands are classified into first and second types of commands, wherein the first type of command does not require an operation completion result of the N number of memory devices, wherein the second type of command requires the operation completion result of the N number of memory devices as the response thereto, wherein each of the N number of operation control sections completes the control of the N number of memory devices when it provides the N number of memory devices with the first type of command, and wherein each of the N number of operation control sections completes the control of the N number of memory devices when it provides the plurality of memory devices with the second type of command and the change operation control unit further receives the operation completion response from the N number of memory devices.

19. The memory system according to claim 18, wherein the second type of command includes several subcommands, and wherein each of the first and second operation control sections completes the control of the plurality of memory devices when each operation in response to each subcommand included in the second type of command is completed by the plurality of memory devices.

* * * * *